(12) United States Patent
Campbell et al.

(10) Patent No.: US 11,338,785 B2
(45) Date of Patent: May 24, 2022

(54) EXTENDING THE LIFE OF ELECTROMAGNETIC BRAKE CONTROL CIRCUITS

(71) Applicant: Rockwell Automation Technologies, Inc., Mayfield Heights, OH (US)

(72) Inventors: Alan J. Campbell, Mequon, WI (US); Timothy J. Strandt, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 198 days.

(21) Appl. No.: 16/751,430

(22) Filed: Jan. 24, 2020

(65) Prior Publication Data
US 2021/0229650 A1 Jul. 29, 2021

(51) Int. Cl.
*B60T 13/74* (2006.01)
*F16D 63/00* (2006.01)
*H01H 47/32* (2006.01)
*F16D 121/22* (2012.01)

(52) U.S. Cl.
CPC .......... *B60T 13/748* (2013.01); *F16D 63/002* (2013.01); *H01H 47/32* (2013.01); *F16D 2121/22* (2013.01)

(58) Field of Classification Search
CPC .. B60T 13/748; F16D 2121/22; F16D 63/002; H01H 47/32
See application file for complete search history.

(56) References Cited

U.S. PATENT DOCUMENTS

| 5,650,901 | A  | * | 7/1997 | Yamamoto | H01H 9/542 361/100 |
| 2012/0286862 | A1 | * | 11/2012 | Korrek | G05B 9/02 330/147 |
| 2015/0303676 | A1 | * | 10/2015 | Hertz | H02H 3/08 361/31 |
| 2019/0052197 | A1 | * | 2/2019 | Thatcher | H02P 3/24 |
| 2019/0190406 | A1 | * | 6/2019 | Jonas | H02P 1/46 |

FOREIGN PATENT DOCUMENTS

| EP | 3503147 | A1 |   | 6/2019 |
| EP | 3460603 | B1 | * | 9/2020 |
| WO | 0156827 | A1 |   | 8/2001 |
| WO | 2014032718 | A1 |   | 3/2014 |

OTHER PUBLICATIONS

European Search Report for EP Application No. 20217837.2 dated May 25, 2021, 7 pages.

\* cited by examiner

*Primary Examiner* — Pamela Rodriguez
(74) *Attorney, Agent, or Firm* — Fletcher Yoder, P.C.

(57) ABSTRACT

A method may include receiving, via a processor, a request to enable movement of a rotor. The method may involve sending a first signal to a mechanical relay system in response to receiving the request, such that the second signal may cause a mechanical relay to close. The mechanical relay system is configured to couple a first conductor to an EM brake. The method may also include sending a second signal to a solid-state relay system after sending the first signal to the mechanical relay system, such that the second signal may cause a solid-state relay to close. The solid-state relay system may couple a second conductor to the EM brake, such that the EM brake may open after receiving power via the first conductor and the second conductor.

20 Claims, 3 Drawing Sheets

EXTENDING THE LIFE OF ELECTROMAGNETIC BRAKE CONTROL CIRCUITS

BACKGROUND

This disclosure relates generally to systems and methods for controlling an electromagnetic brake that prevents motor rotor movement. More specifically, embodiments of the present disclosure are directed toward systems and methods for extending the life of circuits used to control the operation of an electromagnetic (EM) brake system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Motor drive systems may include a control and monitoring system to control the operation of an EM brake used to prevent a rotor from moving. The control and monitoring system may monitor statuses and/or receive information from a wide range of devices, such as valves, electric motors, a wide range of sensors, other suitable monitoring devices, or the like. One or more components of the control and monitoring system, such as programming terminals, automation controllers, input/output (I/O) modules, communication networks, human-machine interface (HMI) terminals, and the like, may control the operation of the motor drive system. The controlling of the operation of the motor drive system may include, among other things, operating a circuit to control (e.g., turn on or off) the EM brake, or the like. As the circuit operates over time to control the EM brake, certain circuit components may begin to wear and may be less reliable. As such, improved systems and methods for extending the life of the circuit used to control the EM brake system are desired.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a mechanical relay system that may couple to a first conductor. The system may also include a solid-state relay system that may couple to a second conductor, such that the first conductor and the second conductor may couple to a brake system. The brake system may control movement of a rotor. The system may also include a control system configured to receive a request to stop the movement of the rotor and send a first signal to the solid-state relay system in response to receiving the request. The first signal may cause a solid-state relay to open. The control system may then send a second signal to the mechanical relay system after sending the first signal to the solid-state relay system, such that the second signal is configured to cause a mechanical relay to open.

In another embodiment, a method may include receiving, via a processor, a request to enable movement of a rotor. The method may involve sending a first signal to a mechanical relay system in response to receiving the request, such that the first signal may cause a mechanical relay to close. The mechanical relay system is configured to couple a first conductor to an EM brake. The method may also include sending a second signal to a solid-state relay system after sending the first signal to the mechanical relay system, such that the second signal may cause a solid-state relay to close. The solid-state relay system may couple a second conductor to the EM brake, such that the EM brake may open after receiving power via the first conductor and the second conductor.

In yet another embodiment, a non-transitory computer-readable medium configured to store instructions executable by a processor that, when executed by the processor, cause the processor to receive a request to stop the movement of a rotor. The processor may then send a first signal to a solid-state relay system in response to receiving the request, such that the first signal may cause a solid-state relay to open. The solid-state relay may couple a power supply to an EM brake system configured to control movement of the rotor. Moreover, the processor may send a second signal to a mechanical relay system after sending the first signal to the solid-state relay system, such that the second signal may cause the mechanical relay to open and uncouple the power supply to the EM brake system.

DRAWINGS

These and other features, aspects, and advantages of the embodiments described in the present disclosure will become better understood when the following detailed description is read with reference to the accompanying drawings in which like characters represent like parts throughout the drawings, wherein.

DETAILED DESCRIPTION

Figure 1:
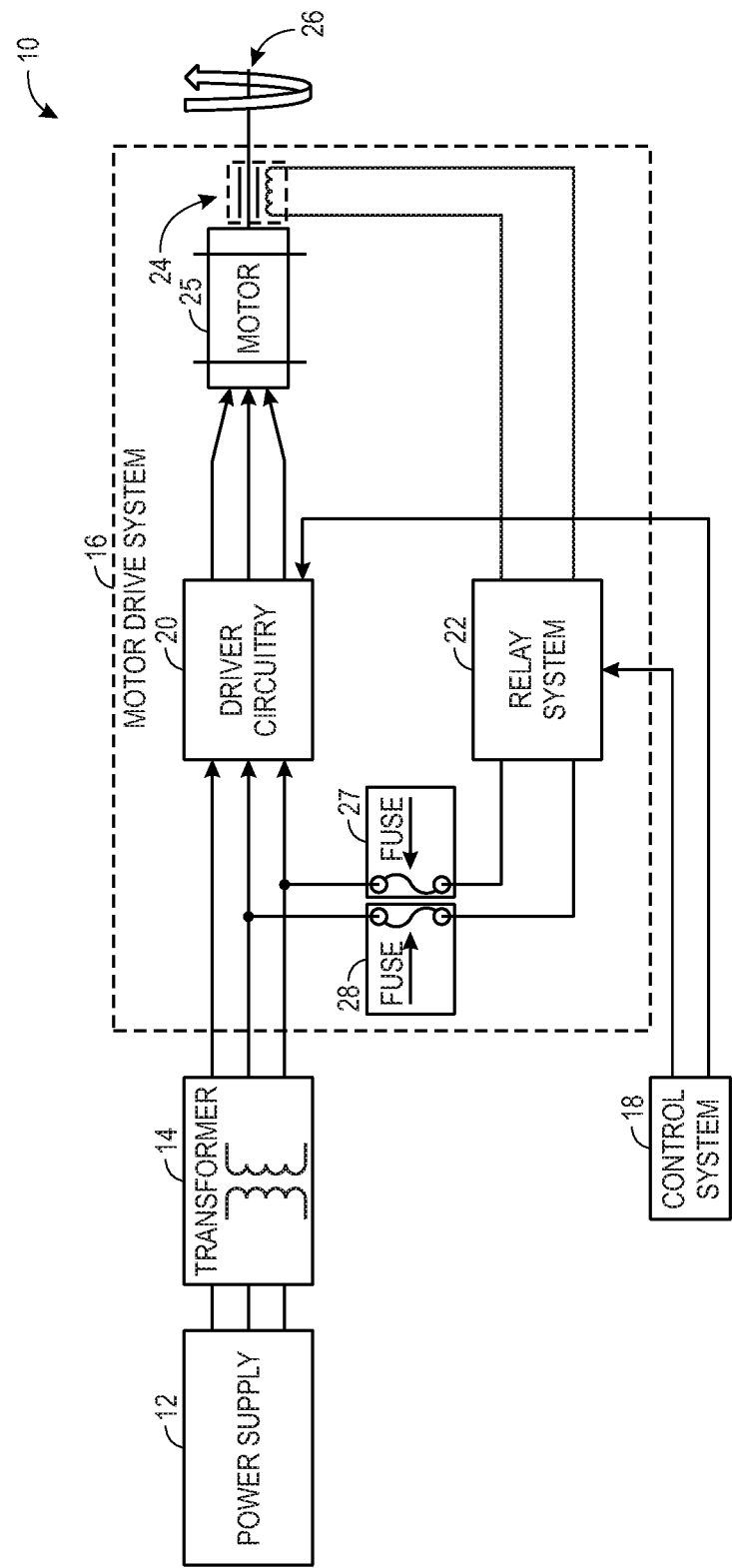
FIG. 1 depicts a block diagram of an electromagnetic (EM) brake system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed toward electromagnetic (EM) brake systems. In some motor drive systems, an electro-mechanical (EM) brake circuit may be used to stop or reduce a speed of a rotor. The EM brake may function as part of a motor drive to allow or prevent rotation of a rotor in the motor. To lock and unlock the rotor, the EM brake circuit may operate in a disengaged mode and engaged mode, respectively. When switching between the disengaged mode and the engaged mode, a power supply may be coupled to a coil (e.g., relay coil) that controls the operation of the EM brake circuit. In some embodiments, a processor may control a switch that connects the power supply to the coil by the way of opening or closing the switch. Various technologies may be used for the switch and the switch may be susceptible to reduced reliability caused by certain deficiencies associated with the respective technology used.

For example, in some embodiments, a mechanical relay may be employed by the EM brake circuit to control when an EM brake closes to stop the rotation of the rotor or opens to allow the rotor to rotate. Over time, as the mechanical relay opens and closes, the contacts of the mechanical relay (e.g., or contactor) may wear due to arcing, contact bounce, and other phenomena. In some instances, due to the wear of the mechanical relay, the mechanical relay may no longer operate as intended, thereby preventing effective control of the EM brake. In other embodiments, solid-state relays may be used to overcome the wearing problem of the mechanical relays. However, in some cases, the solid-state relay may be exposed to transient electrical properties that may cause the solid-state relay to short, thereby again preventing the effective control of the EM brake.

To reduce the wear and increase the reliability of the EM brake circuit, the present disclosure details circuit components that may be used with the EM brake circuit to reduce the wear that may occur on mechanical relays operating the EM brake and increase the reliability of solid-state relays operating on the EM brake. For example, the EM brake circuit may utilize both the mechanical relay and the solid-state relay to overcome deficiencies of each other. That is, a mechanical relay and solid-state relay (e.g., Isolated TRIAC, Back to Back SCR or IGBT) may be positioned between a power source and an EM brake on different conductors. When the two relays are closed, the power supply may be coupled to the EM brake, thereby causing the EM brake to unlock and allow the movement of the rotor.

By employing both the mechanical relay and the solid-state relay to control the operation of the EM brake, the present embodiments leverage two different switching technologies to extend the overall operational life of the EM brake circuit. For example, the embodiments described herein may include closing the mechanical relay prior to closing the solid-state relay, such that current is not present when the mechanical relay closes. In the same manner, the embodiments described herein may include opening the solid-state relay first prior to opening the mechanical relay, such that the mechanical relay is opened after the current flow is reduced to zero. As a result, the present embodiments described herein reduce wear on contacts of the mechanical relay since current has limited availability to causing arcing and similar types of phenomena. Additional details with regard to the embodiments described herein are provided below with reference to FIGS. 1-4.

By way of introduction, FIG. 1 is a block diagram of an exemplary EM brake system 10 having a power supply 12, a transformer 14, motor drive circuitry 16 and a control system 18. The power supply 12 as any suitable three-phase power source such as a generator, an electric utility, and the like. The power supply 12 may provide electrical power through three transmission lines to the transformer 14, and the transformer 14 may transform the received electrical power into transformed (e.g., step-up, step-down) electrical power to provide to the motor drive 16. The use of three transmission lines is by the way of example and various number of power transmission lines may be used in different embodiments. The transformer 14 may convert the electrical power based in part upon the power specifications of the motor drive system 16. The transformer 14 may provide the transformed electrical power to drive circuitry 20, such that the transformed electrical power may be modified to control a motor 25. The motor 25 may use a certain level of electrical power in the form of alternating or direct current to control a rotation of a rotor 26. That is, the drive circuitry 20 may provide electrical power to energize the motor 25 to control movement of the rotor 26 and a shaft of the motor 25.

In some embodiments, an EM brake 24 may be used to lock and unlock movement of the rotor 26. The EM brake 24 may be an electromagnetic brake that slows or stops motion using an electromagnetic force to apply mechanical resistance (e.g., friction) to the rotor. In some embodiments, the EM brake 24 may be controlled by the relay system 22. That is, the relay system 22 may control a flow of current or electricity to the EM brake 24 via certain switching components to control the operation of the EM brake 24. For example, two phases of power output by the transformer 14 may be provided to the relay system 22 via a fuse 27 and a fuse 28, respectively. The relay system 22 may couple the two phases of power output by the transformer 14 to the EM brake 24 when the switching components (e.g., relays) within the relay system 22 are closed. When power is provided to the EM brake 24, the EM brake 24 may open to allow movement of the rotor 26. On the other hand, when the power is removed from the EM brake 24, the EM brake 24 may close to stop the movement of the rotor 26.

To control the operation of the relay system 22, the EM brake 24, and the drive circuitry 20, the control system 18 may send control signals to the respective devices. In some embodiments, the control system 18 may include a computing device or any other suitable control device that may communicate with the devices described herein via any suitable communication network, such as a wired network, a wireless network, and/or a combination of the two. In addition, the control system 18 may include computing devices, controllers, drivers, processing circuitry, or the like that have communication abilities, processing abilities, and the like. For example, the control system 18 may be any suitable processing circuitry including a programmable logic controller (PLC), a programmable automation controller (PAC), or any other controller that may monitor, control, and operate an industrial automation device or component. The control system 18 may be incorporated into any physical device (e.g., the industrial automation components) or may be implemented as a stand-alone computing device (e.g., general purpose computer), such as a desktop computer, a laptop computer, a tablet computer, a mobile device computing device, or the like.

The control system 18 may receive data from various sensors, fuses, or other components to control an operation of at least a portion of the EM brake system 10. For example, the control system 18 may receive data from the fuse 27 and/or the fuse 28 and may use the data to control operations of the relay system 22.

Figure 2:
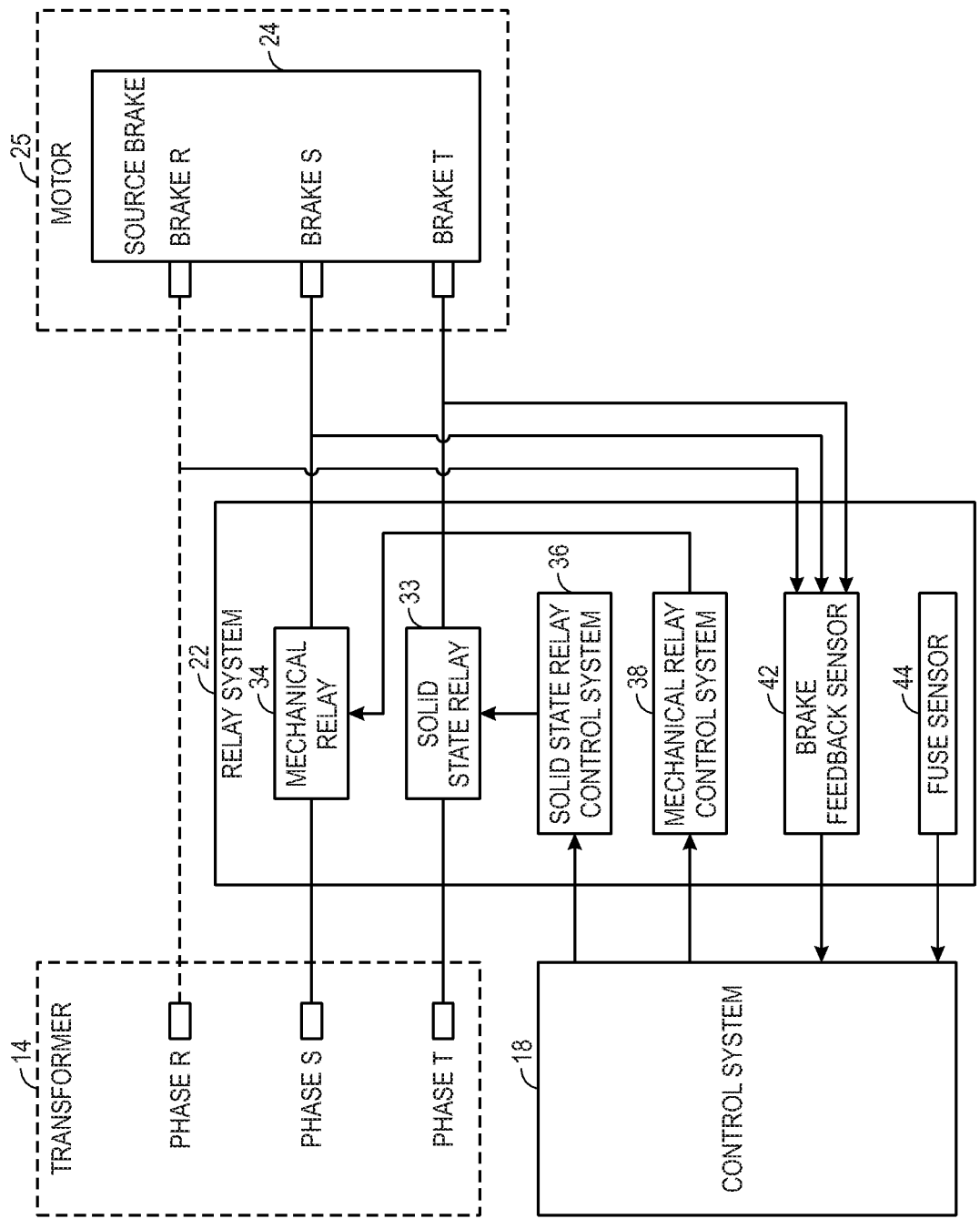
FIG. 2 depicts a block diagram of a relay system of the EM brake system of FIG. 1 that may control operations of the relay system, in accordance with an embodiment.

The relay system 22 may include, among other things, a mechanical relay 34, a mechanical relay control system 38, a solid-state relay 33, a solid-state relay control system 36, a brake feedback sensor 42, and a fuse sensor 44, as shown in FIG. 2. The relay system 22 may receive signals from the control system 18 indicative of certain operational commands. In certain embodiments, the fuse 27 and the fuse 28 may provide overcurrent and/or overvoltage protection, and if the relay system 22 determines that the fuse 27 and the fuse 28 in an open circuit condition, the relay system 22 may transmit a control signal to the control system 18 to indicate that a fault condition is present. The control system 18 may then, in turn, transmit a control signal to the drive circuitry 20 to modify operations of the motor 25 based on the present fault condition. Although the relay system 22 is illustrated as being connected to two lines output by the transformer 14, it should be noted that the relay system 22 may be connected to any combination of lines output by the transformer 14 or other suitable power coverter/source.

Referring now to FIG. 2, FIG. 2 is a block diagram of the relay system 22 described above. As shown in FIG. 2, the relay system 22 may include the solid-state relay 33 coupled to a first conductor and the mechanical relay 34 coupled to a second conductor, such that the solid-state relay 33 and the mechanical relay 34 may form first and second conductive paths between the transformer 14 and the EM brake 24 associated with the motor 25. In some embodiments, the solid-state relay control system 36 may control the operations of the solid-state relay 33 by the way of providing or removing electrical power to the gate of the solid-state relay 33. In the same way, the mechanical relay control system 38 may control the operations of the mechanical relay 34 by the way of providing or removing electrical power to a coil of the mechanical relay 34. Furthermore, the control system 18 may provide control signals to the solid-state relay control system 36 and the mechanical relay control system 38 to control the solid-state relay 33 and the mechanical relay 34, respectively. The brake feedback sensor 42 may detect an operational status of the motor 25 and the EM brake 24. The fuse sensor 44 may also be used to monitor a fuse status of fuses that may be part of the EM brake system 10.

By way of operation, the solid-state relay 33 and the mechanical relay 34 may be closed to couple the two conductors from the transformer 14 to the EM brake 24 to allow the motor 25 to move. That is, the power provided to the EM brake 24 may energize components of the EM brake 24, thereby causing the EM brake 24 to open and unlock the rotation of the shaft or the rotor 26 of the motor 25. To control the operations of the solid-state relay 33 and the mechanical relay 34, the control system 18 may send signals to the solid-state relay control system 36 to remove a voltage signal from a gate of the solid-state relay 33 and/or may send signals to the mechanical relay control system 38 to remove a voltage provided to the coil of the mechanical relay 34. Removing the drive voltage signal from the gate of the solid-state relay 33 and/or removing voltage from the coil of the mechanical relay 34 may cause the respective relay device to open. The open circuit on any of the conductors between the transformer 14 and the EM brake 24 may de-energize the EM brake 24 and cause the EM brake 24 close and stop the movement of the rotor 26.

The control system 18 may receive data from the brake feedback sensor 42, the fuse sensor 44, or various other sensors and use the data to control operations of the relay system 22. For example, the control system 18 may receive a sensor data indicative a temperature of the motor 25 exceeding a threshold. Based on this sensor data, the control system 18 may control the solid-state relay control system 36 and/or the mechanical relay control system 38 to cause the EM brake 24 to close and stop the rotation of the rotor 26.

To minimize wear on the mechanical relay 34, in certain embodiments, the control system 18 may control the operations of the solid-state relay 33 and the mechanical relay 34 according to a procedure. For instance, when stopping the rotation of the rotor 26 by closing the EM brake 24, the control system 18 may send a first signal to the solid-state relay control system 36 to remove a gate signal from the gate of the solid-state relay 33, thereby causing the solid-state relay 33 to turn off and electronically open the connection between the transformer 14 and the EM brake 24. As such, the EM brake 24 may transition from an unlocked state to a locked state where the movement of the rotor 26 may be restricted to a stop. The control system 18 may then send a second signal to the mechanical relay control system 38 to remove a voltage signal from the coil of the mechanical relay 34, thereby causing contacts of the mechanical relay 34 to open so that the transformer 14 and the EM brake 24 are not electrically coupled to each other.

The aforementioned embodiment may reduce the wear of the mechanical relay 34 by limiting the exposure of the mechanical relay 34 to current switching, since the opening of the solid-state relay 33 removed the presence of current from the conductor coupled to the mechanical relay 34. Moreover, the control system 18 may utilize the solid-state relay 33 to control the EM brake 24, as well as the mechanical relay 34 to control the EM brake 24 in case the solid-state relay 33 becomes inoperable. That is, in some situations, the solid-state relay 33 may be exposed to electrical noise or transients that may cause the solid-state relay 33 to short to a closed state, thereby limiting the ability of the solid-state relay 33 to control the EM brake 24. As such, the mechanical relay 34 may still be used to control the operation of the EM brake 24 in case that the solid-state relay 33 become unavailable.

Although the foregoing description of the relay system 22 includes the solid-state relay control system 36 and the mechanical relay control system 38 as separate components, it should be noted that the description of these components are provided for illustrative purposes and the present embodiments described herein should not be limited as such. Indeed, in some embodiments, the functions of the solid-state relay control system 36 and the mechanical relay control system 38 may be incorporated into and performed by control system 18 or any other suitable control component.

Figure 3:
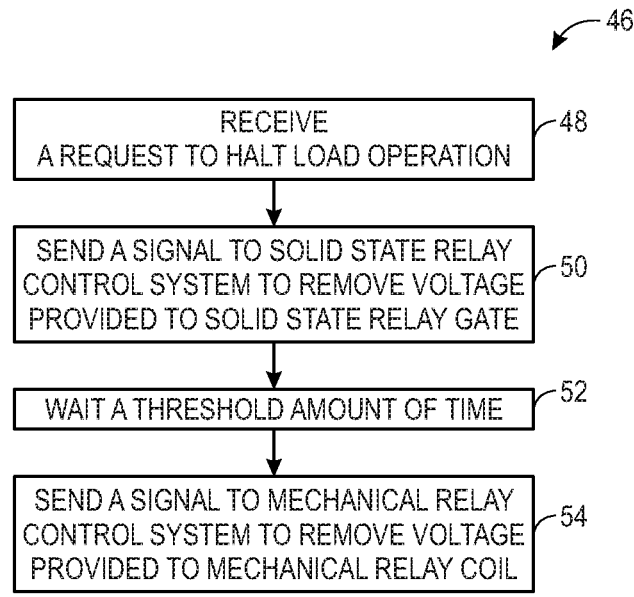
FIG. 3 is a flowchart of a method for causing the EM brake system to disengage and lock a rotor's movement, in accordance with an embodiment.

To further clarify the operation of the relay system 22, FIG. 3 is a flowchart of a method 46 for operating the relay system 22 to stop the movement of the rotor 26 by the way of controlling operations of the EM brake 24. Although the method 46 is described as being performed by the control system 18, it should be understood that the method 46 may be performed by any suitable component. For example, a computing device, or any suitable processing circuitry may perform some or all of the method 46.

Referring now to FIG. 3, at block 48, the control system 18 may receive a request to stop the rotation of the rotor 26. The request may be received via a user input to the control system 18. In some embodiments, the control system 18 may automatically generate the request based on data received from various sensors in the EM brake system 10.

After receiving the request at block 48, the control system 18 may proceed to block 50 and send a signal to the solid-state relay control system 36 instructive to remove the gate signal provided to the solid-state relay 33. After the solid-state relay control system 36 removes the gate signal from the gate of the solid-state relay 33, the solid-state relay may open and create an open circuit between the transformer 14 and the EM brake 24, thereby causing the EM brake 24 to close and halt the movement of the rotor 26 or the shaft of the motor 25.

In some embodiments, at block 52, the control system 18 may wait a threshold amount of time for the movement of the rotor 26 to come to a complete stop. In certain embodiments, the threshold amount of time may be predetermined. In other embodiments, the threshold amount of time may be determined by a processor or the control system 38 based on feedback from various sensors in the EM brake system 10. That is, in some cases, the various sensors may provide data indicative of a time in which voltage and/or current associated with the EM brake 24 goes to zero prior to opening the mechanical relay 34. This sensor data may be indicative of the rotor 26 coming to a complete stop and thus may be used to determine the threshold amount of time.

Afterwards, at block 54, the control system 18 may send a second signal to the mechanical relay control system 38 to remove voltage provided to a coil of the mechanical relay 34. By waiting the threshold amount of time, the control system 18 may limit a likelihood that the mechanical relay 34 will be exposed to current switching or transient signals present on the respective conductor. The delay may be defined as a threshold amount of time (e.g., 10-50 milliseconds) before the movement of the rotor 26 or shaft is expected to stop, an expected amount of time for current present in the conductors to dissipate, or the like. By performing the method 46, the control system 18 may reduce the wear of the mechanical relay 34 by limiting the mechanical relay 34 exposure to current switching and other electrical arcing phenomena.

Figure 4:
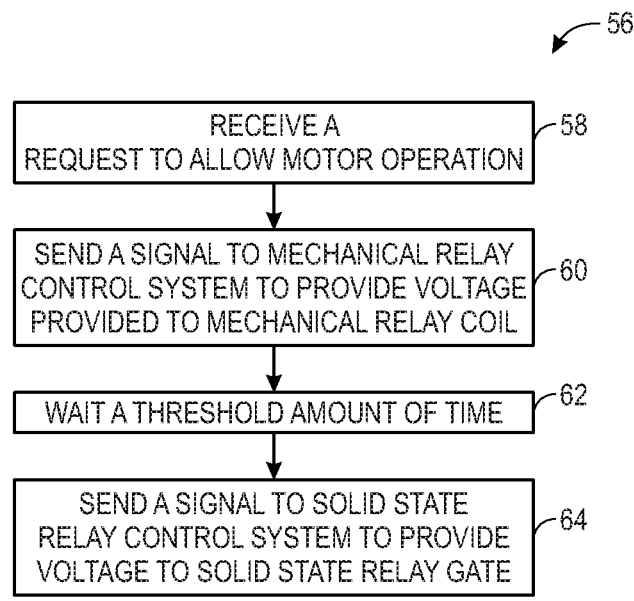
FIG. 4 is a flowchart of a method for causing the EM brake system to engage and allow a rotor's movement, in accordance with an embodiment.

Keeping the foregoing in mind, FIG. 4 is a flowchart of a method 56 for operating the relay system 22 to resume movement of the rotor 26. Although the method 56 is described as being performed by the control system 18, it should be understood that the method 56 may be performed by any suitable component. For example, a computing device, or any suitable processing circuitry may perform some or all of the method 56.

Referring now to FIG. 4, at block 58, the control system 18 may receive a request to enable the movement of the rotor 26. The request may be provided via a user input to the control system 18. In some embodiments, the control system 18 may generate the request after detecting that conditions are suitable for the rotor 26 to begin moving based on data received by various sensors.

Prior to receiving the request at block 58, the solid-state relay 33 and mechanical relay 34 be both be in an open state, thereby prevent power from reaching the EM brake 24 and causing the EM brake 24 to remain closed.

After receiving the request at block 58, the control system 18 may proceed to block 60 and send a signal to the mechanical relay control system 38. The signal may cause the mechanical relay control system 38 to connect a voltage signal to the coil of the mechanical relay 34. The mechanical relay 34 may then close and connect the transformer 14 and the EM brake 24.

At block 62, the control system 18 may wait a threshold amount of time before proceeding to block 64. At block 64, the control system 18 may send a signal to the solid-state relay control system 36, such that the solid-state relay control system 36 may provide a gate signal to the gate of the solid-state relay 33, thereby causing the solid-state relay 33 to close. After both the mechanical relay 34 and the solid-state relay 33 closes, the EM brake 24 may be energized via the conductive paths provided via the conductors associated with the mechanical relay 34 and the solid-state relay 33. After energizing, the EM brake 24 may open and allow the movement of the rotor 26 or the shaft. By way of design, the mechanical relay 34 may be closed before the solid-state relay 33 to limit the exposure of current switching to the mechanical relay 34.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
motor driver circuitry configured to provide controlled power an electric motor to drive a motor rotor in rotation;
a mechanical relay system configured to couple to a first conductor;
a solid-state relay system configured to couple to a second conductor, wherein the first conductor and the second conductor are configured to couple to electromechanical (EM) brake system, and wherein the brake system is configured to frictionally control movement of the rotor;
wherein the mechanical relay system and the solid-state relay system are electrically coupled parallel to the motor driver circuitry; and
a control system configured to:
receive a request to stop the movement of the rotor;
send a first signal to the solid-state relay system in response to receiving the request, wherein the first signal is configured to cause a solid-state relay to open; and
send a second signal to the mechanical relay system after sending the first signal to the solid-state relay system, wherein the second signal is configured to cause a mechanical relay to open.

2. The system of claim 1, wherein the control system is configured to send the first signal to an additional control system configured to control one or more operations of the solid-state relay or the mechanical relay.

3. The system of claim 1, wherein the first signal is configured to remove a gate signal from a gate of the solid-state relay.

4. The system of claim 1, wherein the second signal is configured to remove a voltage signal from a coil of the mechanical relay.

5. The system of claim 4, wherein the coil is configured to control movement of one or more contacts of the mechanical relay.

6. The system of claim 1, wherein the brake system comprises an electromagnetic brake.

7. The system of claim 1, wherein the brake system is configured to close in response to power being removed from the brake system.

8. The system of claim 1, wherein the second signal is transmitted after waiting a threshold amount of time.

9. The system of claim 8, wherein the threshold amount of time is associated with an amount of time for current to reduce to zero on the second conductor.

10. A method, comprising:
receiving, via a processor, a request to enable movement of a rotor;
sending, via the processor, a first signal to a mechanical relay system in response to receiving the request, wherein the first signal is configured to cause a mechanical relay to close, and wherein the mechanical relay is configured to couple a first conductor to an electromechanical (EM) brake that frictionally controls movement of the rotor; and
sending, via the processor, a second signal to a solid-state relay system after sending the first signal to the mechanical relay system, wherein the second signal is configured to cause a solid-state relay to close, wherein the solid-state relay is configured to couple a second conductor to the EM brake, and wherein the EM brake is configured to open after receiving power via the first conductor and the second conductor;
wherein the rotor is driven by motor driver circuitry configured to provide controlled power to drive an electric motor comprising the rotor; and
wherein the mechanical relay system and the solid-state relay system are electrically coupled parallel to the motor driver circuitry.

11. The method of claim 10, wherein the EM brake comprises an electromagnetic brake.

12. The method of claim 10, comprising:
receiving an additional request to stop the movement of the rotor;
sending a third signal to the solid-state relay system in response to receiving the additional request, wherein the third signal is configured to cause the solid-state relay to open; and
sending a fourth signal to the mechanical relay system after sending the third signal to the solid-state relay system, wherein the fourth signal is configured to cause the mechanical relay to open.

13. The method of claim 10, wherein the first signal comprises a voltage signal provided to a coil of the mechanical relay.

14. The method of claim 10, wherein the second signal comprises a gate signal provided to a gate of the solid-state relay.

15. A non-transitory computer-readable medium configured to store instructions executable by a processor that, when executed by the processor, cause the processor to:
receive a request to stop movement of a rotor;
send a first signal to a solid-state relay system in response to receiving the request, wherein the first signal is configured to cause a solid-state relay to open, and wherein the solid-state relay is configured to couple a power supply to a brake system configured to frictionally control movement of the rotor; and
send a second signal to a mechanical relay system after sending the first signal to the solid-state relay system, wherein the second signal is configured to cause a mechanical relay to open, and wherein the mechanical relay is configured to couple the power supply to the brake system
wherein the rotor is driven by motor driver circuitry configured to provide controlled power to drive an electric motor comprising the rotor; and
wherein the mechanical relay system and the solid-state relay system are electrically coupled parallel to the motor driver circuitry.

16. The non-transitory computer-readable medium of claim 15, wherein the instructions executable by the processor cause the processor to send the first signal to an additional control system configured to control on or more operations of the solid-state relay.

17. The non-transitory computer-readable medium of claim 15, wherein the instructions executable by the processor cause the processor to send the first signal to an additional control system configured to control one or more operations of the mechanical relay.

18. The non-transitory computer-readable medium of claim 15, wherein the instructions executable by the processor cause the processor to send the second signal to the mechanical relay system a threshold amount of time after sending the first signal.

19. The non-transitory computer-readable medium of claim 15, wherein the first signal is sent to a gate of the solid-state relay.

20. The non-transitory computer-readable medium of claim 15, wherein the second signal is sent to a coil of the mechanical relay.

* * * * *